United States Patent Office 2,728,420
Patented Dec. 27, 1955

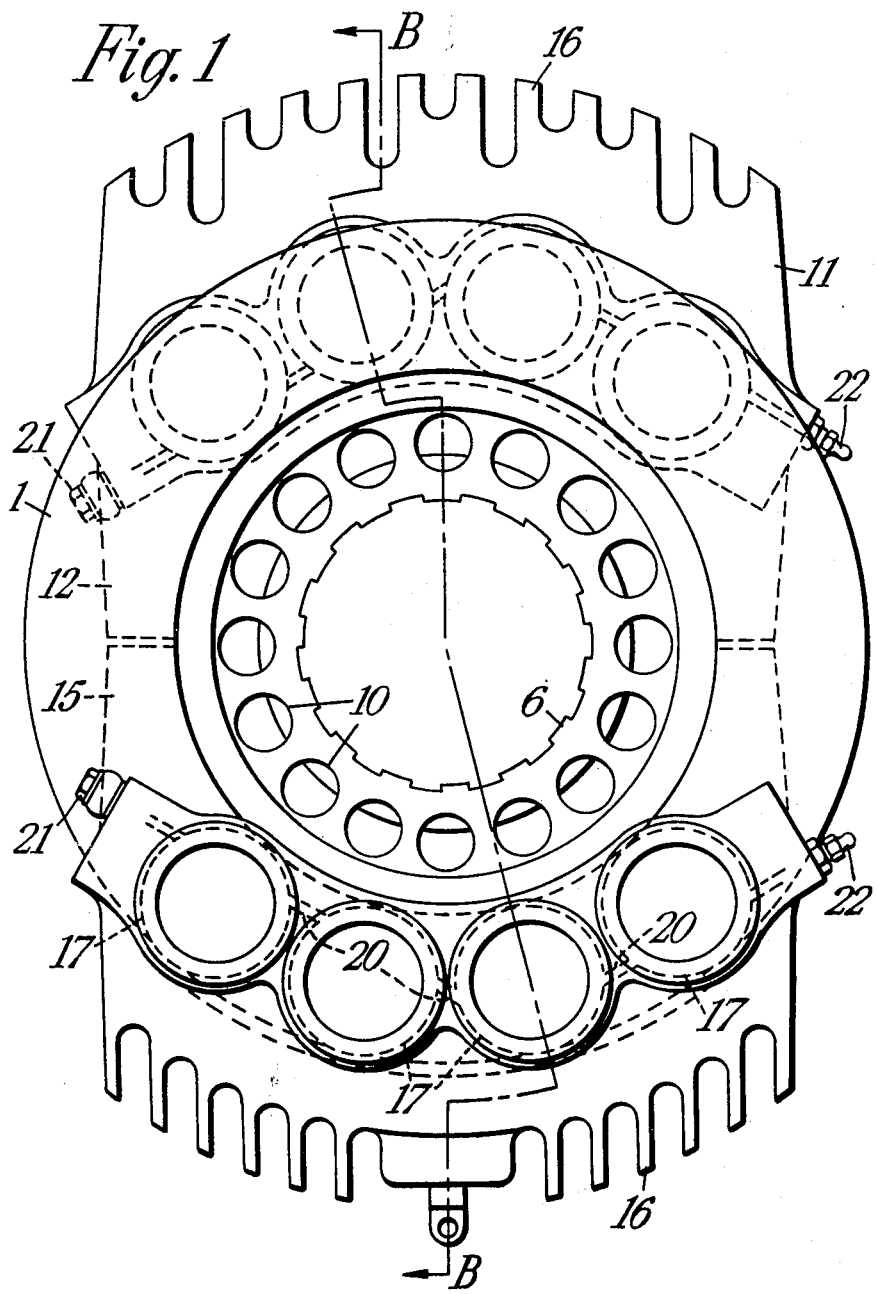

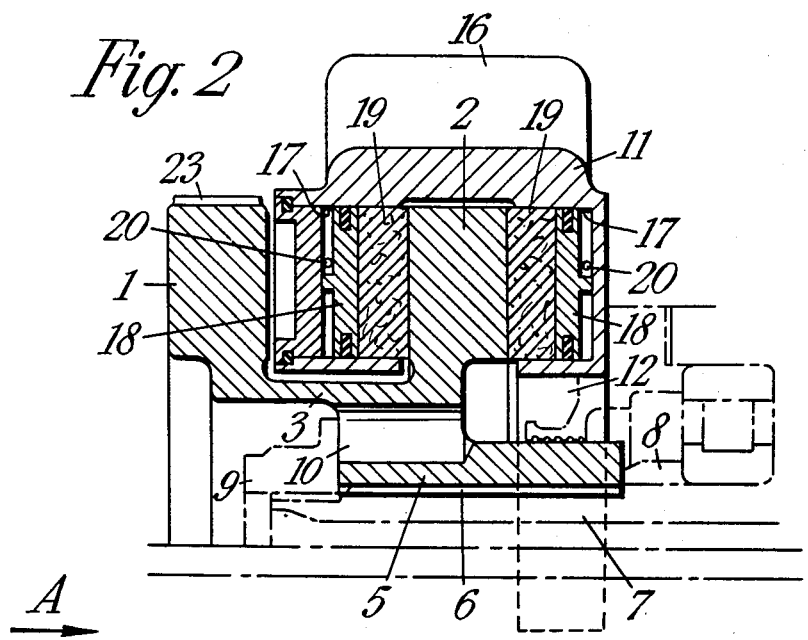
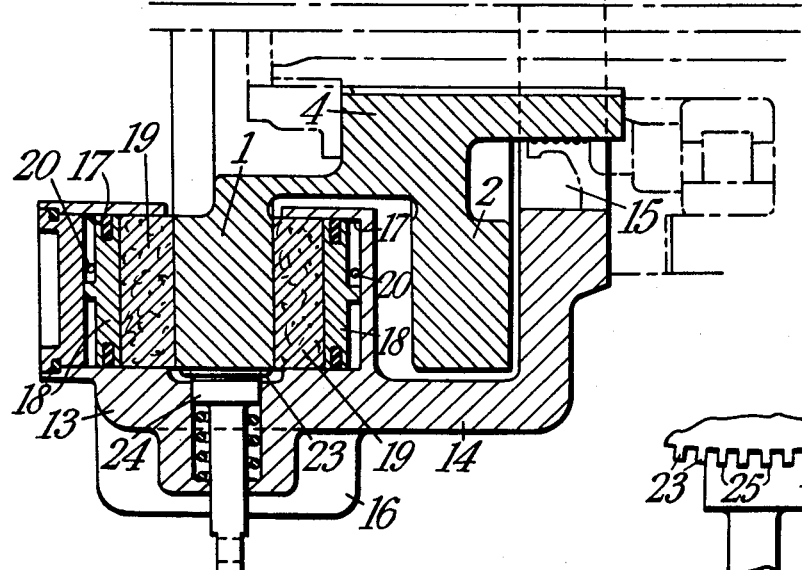

2,728,420

DISC BRAKE FOR VEHICLES

Joseph Wright, Solihull, and Henry James Butler, Sutton Coldfield, England, assignors to Dunlop Rubber Company Limited, London, England, a British company Application February 26, 1952, Serial No. 273,482

Claims priority, application Great Britain March 14, 1951

12 Claims. (Cl. 188—152)

This invention relates to disc brakes for vehicles, and more particularly to disc brakes for heavy commercial vehicles, track-laying vehicles and the like.

Track-laying vehicles, e. g. tanks and the like, require very powerful brakes both for retardation and for steering. The brakes should not only be powerful but also be substantially insensitive to "brake fade," since they are liable to hard wear for indefinite periods. "Brake fade" is caused mainly by the heat generated on braking causing an exudation of the oils and binders contained in the pads of friction material, which has the effect of lubricating the braking surfaces of the braking member, and causing a falling-off in the efficiency of the brakes. Tank brakes in the past have normally comprised drums rotatable by the main drive shaft of the tank and friction means co-operating with the inner peripheral wall of the drum for decelerating the drum and hence the tank. It is difficult with such enclosed brakes for the heat generated on braking to be readily dissipated into the atmosphere, with the result that the brake gets very hot in service and "brake fade" ensues.

It is the object of the present invention to provide an improved brake for heavy vehicles including track-laying vehicles which is powerful in operation, comparatively light and compact and which is not as subject to "brake fade" as the conventional type of drum brake.

According to the invention a disc brake for vehicles comprises a plurality of axially-spaced brake discs connected together at a periphery and rotatable by movement of a vehicle, a non-rotatable housing straddling each of said discs and fluid pressure operated mechanisms associated with each of said housings adapted to urge pads of friction material into frictional contact with said discs.

Preferably the mechanisms are so spaced that the positions of application of the braking pressure are evenly distributed around each disc and around the discs as a whole. For instance, with two discs there may be a single position of application on each disc, the two positions being diametrically opposite, or there may be two diametrically opposite positions on each disc, those on one disc being displaced through 90° with respect to the others.

Preferably also the discs are secured together at their inner peripheries and a radially-extending annular flange connects them with a rotatable member, said flange being provided with a plurality of axially-extending holes to restrict the transmission of heat generated on braking to the rotatable member. One of the discs may be provided with means for non-rotatably locking the discs and thus acting as a static or parking brake.

In order that the invention may be more fully described, reference is made to the accompanying drawings of which:

Figure 1 is a view of a brake constructed in accordance with the present invention and looking in the direction of the arrow A of Figure 2;

Figure 2 is a sectioned view through the line B—B of Figure 1 looking in the direction of the arrows; and Figure 3 is a partial view showing details of a parking brake.

In the present embodiment of the invention (Figs. 1 and 2) a retardation brake for a tank comprises a braking member having two radially-extending disc parts 1 and 2 and a portion whereby said member may be secured to a driving shaft. The two disc parts are axially spaced and are interconnected at their inner peripheries by an axially-extending annular member 3. The annular member is connected to a radially-extending annular flange 4 which in turn is connected to one end of a sleeve 5 which is provided on the inner periphery thereof with a plurality of axially-extending splines 6. The sleeve is adapted to be fitted to a driving shaft 7 having a plurality of axially-extending recesses complementary to said splines, and when fitted to said shaft one end of the sleeve abuts an annular stop 8 integral with the shaft and the sleeve is retained in this position by a nut 9 engaging with the end of the shaft, which is threaded. The annular flange is provided with a plurality of equi-spaced axially-extending holes 10 therethrough to retard the heat transfer from the disc parts to the sleeve as said disc parts are heated by the application of the brakes.

A part-annular housing 11 of U-section straddles the outer periphery of a portion of the disc part 2, one of the limbs of the housing being located between the two discs parts and the other limb being located on one side of the braking member. Said latter limb is provided integrally with a radial inwardly-extending flange 12 provided with bolt holes whereby the housing may be non-rotatably secured to a part of the tank structure.

Another similar housing 13 straddles the outer periphery of the other disc part 1 at a location diametrically opposed to said first housing, and the outer periphery of said latter housing is provided with an axially-extending portion 14 straddling the outer periphery of said first disc part 2 and a radial inwardly-extending flange 15 provided with bolt-holes, whereby the housing may similarly be non-rotatably secured to the same part of the tank structure. One limb of this latter housing is located between the two disc parts, the other limb being located on the side of the braking member remote from the securing flange. Both the housings are provided with stiffening ribs 16 which extend axially across the outer peripheral surface.

Each limb of both housings is provided with four equi-spaced and axially-aligned cylinders 17, the cylinders in one limb of each housing being axially-aligned with the cylinders in the other limb of the same housing. The diameter of each of said cylinders is approximately equal to the radial width of said disc parts.

The cylinders of each pair are open at their adjacent ends. A plunger 18 is fluid-tightly and slidably fitted in each cylinder and a cylindrical pad 19 of friction material is also slidable in each cylinder, one planar face thereof abutting the plunger and the other face being adapted to contact the associated disc part. A fluid conduit 20 is provided between adjacent cylinders in the same limb of each housing, one end cylinder of each group of four being provided with a nozzle 2 and adapted for connection with a source of fluid pressure and the other end cylinder being provided with a bleed-vent 22.

The braking member is thus rotatable by the driving shaft and the two housings and associated parts are non-rotatably secured to the tank. As the driver of the tank applies his brake the cylinders are pressurised, forcing the plungers and friction pads inwards towards their associated disc part. Frictional engagement is thus effected between the friction pads and disc parts, the degree of braking depending on the amount of braking pressure exerted by the driver of the tank.

Owing to the number of friction pads and associated operating mechanisms, sixteen in all, acting on the braking member, a disc brake of this nature is very powerful in operation. Moreover, only a minor proportion of the braking surface of each disc part, approximately one quarter, is covered by the friction pads associated with each housing, thus the major portion of the disc part is exposed to the air, and the heat generated on braking is speedily dissipated. The exposed portions of each disc part may be more speedily cooled by directing a stream of compressed air thereon.

It may be desirable, in certain applications, to fit a static or parking brake to the disc brake of the present invention. Thus, in another embodiment of the invention (Figures 2 and 3) the disc part 1 is provided at its outer periphery with radially outstanding, axially-extending rectangular projections 23. A spring-loaded plunger 24 which is slidable in a hole in the outer peripheral part of housing 13 is connected at one end by a linkage to a hand-lever or similar device under the control of the driver of the vehicle. The other end of the plunger is provided with rectangular slots 25 complementary with the projections 23, and adapted to mate therewith. These parts are disengaged during normal running of the vehicle but when the vehicle is stationary the hand-lever or similar device is operated to allow the plunger, under the action of its spring, to move towards the disc. The slots on the plunger either engage with the projections on the disc to lock the disc against rotation, or alternatively, if they do not mate at once they will do so as soon as the disc commences to rotate.

The two disc parts need not necessarily be integrally connected, as described, but may be bolted together at their inner peripheries. Similarly the limbs of each housing may be provided with any number of cylinders and associated parts. More than two axially extending disc parts may be provided, for example, a brake for a tank may be provided with three disc parts connected together, two of them, as described, being used as retardation brakes and the third being used as steering brake. In this case the three housings are preferably angularly equi-spaced around the periphery of the braking member.

Having described our invention what we claim is:

1. A disc brake for vehicles comprising at least two axially spaced discs connected at a periphery to each other rigidly against relative axial and rotational displacement and engaging with a rotatable part of said vehicle, a non-rotatable housing straddling a periphery of each disc, the housing of one disc being angularly spaced from the housing of an adjacent disc, a fluid pressure operated mechanism associated with each housing and a pad of friction material axially movable by said mechanism into frictional engagement with a disc.

2. A disc brake for vehicles comprising at least two axially spaced rotatable discs connected at their inner peripheries to each other rigidly against relative axial and rotational displacement and engaging with a rotatable part of the vehicle, non-rotatable diametrically opposed housings, each straddling a portion of one of the discs, pads of friction material associated with the housings to frictionally engage the discs between them and fluid pressure operated piston and cylinder mechanisms located within the housings on each side of each disc to effect said engagement.

3. The disc brake of claim 2 in which the housings are of U-section and straddle a portion of the outer periphery of the associated discs, said housings having axially extending strengthening ribs.

4. The disc brake of claim 3 wherein the pads of friction material are cylindrical and are slidable within the cylinders of the housing.

5. The disc brake of claim 4 in which the discs are connected together at their inner periphery by an axially extending member having a radial flange extending inwardly therefrom and an axially extending sleeve secured thereto, said sleeve being adapted to be driven by the vehicle driving means.

6. The disc brake of claim 5 wherein said flange is provided with a plurality of holes extending axially therethrough to restrict the transmission of heat from the discs to the driving sleeve.

7. The disc brake of claim 6 comprising a plunger and wherein the outer periphery of at least one disc is provided with projections to mate with complementary recesses at one end of a plunger, a spring to press said plunger towards the disc, said plunger retained out of contact with the disc by means under the control of the driver of the vehicle.

8. A disc brake for vehicles comprising at least two axially spaced brake discs connected at a periphery to each other rigidly against relative axial and rotational displacement and engageable with a rotatable part of a vehicle, non-rotatable housings, one for each of said discs, each straddling a periphery of its respective disc, a fluid pressure operated mechanism for each of said housings, and pads of friction material arranged in pairs on said housings, the pads of each pair being positioned on opposite sides of their respective brake discs to engage a portion of the surface of their respective brake discs, and being movable into engagement with said brake discs by said fluid pressure operated mechanism.

9. The disc brake mechanism of claim 8 in which said brake discs are rigidly connected at their inner peripheries and in which said non-rotatable housings straddle the outer peripheries of their respective discs.

10. The brake disc mechanism of claim 9 in which said non-rotatable housings each comprise complementary pressure operated cylinders and pistons on opposite sides of the respective brake discs.

11. The brake disc mechanism of claim 10 in which said friction pads are cylindrical and extend into said cylinders.

12. The brake disc mechanism of claim 10 in which said fluid pressure operated mechanisms each comprise a number of cylinders and pistons spaced in opposed pairs on opposite sides of the respective brake discs and movable in opposite directions toward and from said brake discs.

References Cited in the file of this patent

UNITED STATES PATENTS

| | | |
|---|---|---|
| 2,115,083 | Pierce | Apr. 26, 1938 |
| 2,145,255 | Granberg et al. | Jan. 31, 1939 |
| 2,395,893 | Marlow | Mar. 5, 1946 |
| 2,503,755 | Martin et al. | Apr. 11, 1950 |
| 2,531,341 | Meador | Nov. 21, 1950 |
| 2,533,008 | Hanson | Dec. 5, 1950 |
| 2,575,578 | Bricker | Nov. 20, 1951 |